(12) United States Patent
Mejdrich et al.

(10) Patent No.: US 8,350,846 B2
(45) Date of Patent: Jan. 8, 2013

(54) UPDATING RAY TRACED ACCELERATION DATA STRUCTURES BETWEEN FRAMES BASED ON CHANGING PERSPECTIVE

(75) Inventors: Eric Oliver Mejdrich, Rochester, MN (US); Paul Emery Schardt, Rochester, MN (US); Robert Allen Shearer, Rochester, MN (US); Matthew Ray Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 12/361,019

(22) Filed: Jan. 28, 2009

(65) Prior Publication Data

US 2010/0188396 A1    Jul. 29, 2010

(51) Int. Cl.
*G06T 15/00* (2011.01)
*G06T 15/50* (2011.01)
*G06T 15/60* (2006.01)
*G06T 1/00* (2006.01)
*G06F 17/00* (2006.01)

(52) U.S. Cl. .................. 345/419; 345/426; 345/418
(58) Field of Classification Search .................. None
See application file for complete search history.

(56) References Cited

U.S. PATENT DOCUMENTS

| | | | | |
|---|---|---|---|---|
| 6,148,324 | A * | 11/2000 | Ransom et al. | 718/105 |
| 7,142,709 | B2 | 11/2006 | Girard | |
| 7,164,420 | B2 | 1/2007 | Ard | |
| 7,852,336 | B2 * | 12/2010 | Brown et al. | 345/427 |
| 2006/0274070 | A1 * | 12/2006 | Herman et al. | 345/474 |
| 2007/0091065 | A1 * | 4/2007 | Misek | 345/157 |
| 2007/0168392 | A1 * | 7/2007 | Delarue et al. | 707/104.1 |
| 2008/0043018 | A1 | 2/2008 | Keller et al. | |
| 2008/0117204 | A1 * | 5/2008 | Thorn | 345/419 |
| 2008/0150944 | A1 | 6/2008 | Reshetov et al. | |
| 2008/0192051 | A1 | 8/2008 | Fowler et al. | |

OTHER PUBLICATIONS

Havran et al. 2003. Exploiting temporal coherence in ray casted walkthroughs. In Proceedings of the 19th spring conference on Computer graphics (SCCG '03). ACM, New York, NY, USA, 149-155.*
Eisemann et al. Automatic Creation of Object Hierarchies for Ray Tracing Dynamic Scenes. In WSCG Short Communications Proceedings 2007, Plzen, Czech Republic, pp. 57-64, Jan. 2007.*

(Continued)

*Primary Examiner* — Kee M Tung
*Assistant Examiner* — Zhengxi Liu
(74) *Attorney, Agent, or Firm* — Toler Law Group

(57) ABSTRACT

A method, program product and system for conducting a ray tracing operation where the rendering compute requirement is reduced or otherwise adjusted in response to a changing vantage point. Aspects may update or reuse an acceleration data structure between frames in response to the changing vantage point. Tree and image construction quality may be adjusted in response to rapid changes in the camera perspective. Alternatively or additionally, tree building cycles may be skipped. All or some of the tree structure may be built in intervals, e.g., after a preset number of frames. More geometric image data may be added per leaf node in the tree in response to an increase in the rate of change. The quality of the rendering algorithm may additionally be reduced. A ray tracing algorithm may decrease the depth of recursion, and generate fewer cast and secondary rays. The ray tracer may further reduce the quality of soft shadows, resolution and global illumination samples, among other quality parameters. Alternatively, tree rebuilding may be skipped entirely in response to a high camera rate of change. Associated processes may create blur between frames to simulate motion blur.

25 Claims, 4 Drawing Sheets

OTHER PUBLICATIONS

K. Bala, J. Dorsey, and S. Tellet. 1998. Bounded-Error Interactive Ray Tracing. Technical Report. Massachusetts Institute of Technology, Cambridge, MA, USA.*

David Cline, Kevin Steele, and Parris Egbert. 2006. Lightweight Bounding Volumes For Ray Tracing. Journal of Graphics, GPU, & Game Tools 11, 4 (2006) 61-71.*

Marc Levoy. 1990. Efficient ray tracing of volume data. ACM Trans. Graph. 9, 3 (Jul. 1990), 245-261.*

Thomas A. Funkhouser and Carlo H. Sequin. 1993. Adaptive display algorithm for interactive frame rates during visualization of complex virtual environments. In Proceedings of the 20th annual conference on Computer graphics and interactive techniques (SIGGRAPH '93). ACM, New York, NY, USA, 247-254.*

Lauterbach, C.; Yoon, S.-E.; Tuft, D.; Manocha, D.; , "RT-DEFORM: Interactive Ray Tracing of Dynamic Scenes using BVHs," Interactive Ray Tracing 2006, IEEE Symposium on , vol., No., pp. 39-46, Sep. 18-20, 2006.*

"Glossary: A Quick Guide to the Mathematical Jargon" http://www.math.ucdavis.edu/~hass/Calculus/HTAC/excerpts/node39.html, Accessed on Jan. 4, 2012.*

* cited by examiner

UPDATING RAY TRACED ACCELERATION DATA STRUCTURES BETWEEN FRAMES BASED ON CHANGING PERSPECTIVE

FIELD OF THE INVENTION

The present invention relates generally to image processing, and more particularly, to updating an acceleration data structure (ADS) in response to a vantage point changing between frames of a ray tracing operation.

BACKGROUND OF THE INVENTION

Ray tracing has become mainstream in video game animation, motion picture and other media applications. Ray tracing describes a technique for synthesizing photorealistic images by identifying and summing paths connecting light sources with cameras. Rays are traced along the line of sight to determine visibility and from light sources to determine illumination.

A ray comprises a half line of infinite length. A ray originates at a point in space described by a position vector and travels along a direction vector. Ray tracing is used in computer graphics to determine visibility by directing the ray from the origin along a line of sight described by the direction vector. The ray is tested for intersection against geometry within a virtual scene to determine the nearest visible surface along that line of sight.

Ray tracing generates an image by tracing the ray through pixels in a plane. The technique is capable of producing a very high degree of photorealism, usually higher than that of typical scanline rendering methods. Ray tracing is capable of simulating a wide variety of optical effects such as reflection and refraction, as well as scattering and chromatic aberration. Scenes may incorporate data from images and models captured by digital photography.

Such scenes in ray tracing are described mathematically by a programmer or visual artist using intermediary tools. For example, most ray tracing processes use an ADS, such as a k-dimensional tree (kd-tree), to generate three-dimensional images. A kd-tree may include empty leaf nodes that correspond to empty bounding volumes within a three-dimensional scene. A bounding volume may comprise a logically divided portion of the scene. A ray tracing algorithm may recursively split the scene by axis-aligned planes. Initially, the scene may be split in two by such a plane. Each resultant half may then be split again along some other plane(s). This results in a hierarchical organization of the kd-tree structure. Each level of the structure may be recursively traversed to determine where the next level of the tree may be found.

The leaf nodes of a kd-tree may include a small axis aligned cell that includes some number of polygons, or primitives. At the next level up the tree, each node represents an axis aligned box that is completely filled by some preset number of leaf nodes. As such, a split-plane splits the larger volume into the smaller leaf cells. At the next level, each node represents an axis aligned box completely filled by the lower level nodes using a similar split-plane. At any given level, a ray may be intersected against the bounding volumes to determine whether the ray misses, hits, refracts and/or reflects from an object.

Each ray is typically tested for intersection with some subset of all the objects in the scene. Once the nearest object has been identified, the algorithm will estimate the incoming light at the point of intersection and examine the material properties of the object. This information may be combined to calculate the final color of the pixel. Certain illumination algorithms and object materials may require more rays to be re-cast into the scene.

Despite the utility of ray tracing, current ray tracing techniques suffer from a number of known limitations and weaknesses. For example, algorithms used to build the ADS may experience slow setup of an ADS, as well as require relatively large amounts of processing and memory. These computing resources are thus unavailable to other aspects of a scene rendering processes. In some cases, more time may be spent building a tree than rendering the image. There are consequently diminishing returns for intelligently building an ADS. Such challenges are exacerbated where a system must handle a series of frames to create a scene. Besides the change in objects of the image data, the perspective of the viewer relative to the object may change from frame-to-frame. Such may be the case where a camera pans or moves across a scene of objects. Such changes conventionally require rapid reconstitution of the ADS, which can burden the system.

There is consequently a need for an improved manner of rendering an image using ray tracing processes.

SUMMARY OF THE INVENTION

The present invention provides an improved computer implemented method, apparatus and program product for rendering an image using ray tracing. Embodiments consistent with the invention may determine a difference between respective ray origins for a plurality of rays cast in each of a plurality of frames each comprising image data. Processing resources used to render the image may be reduced according to the determined difference.

Aspects of the invention may reduce the amount of processing resources used by reusing an acceleration data structure for a preset number of the plurality of frames. One embodiment may skip building an acceleration data structure for a preset number of the plurality of frames. Processes may generally reduce the visual acuity of the rendered image. Where so configured, the rate of change or other difference between frames may affect the generation of an acceleration data structure associated with one of the plurality of frames.

Processing requirements may further be reduced by increasing a number of primitives included per node of an acceleration data structure. In the same or another embodiment, the number of generated secondary rays and/or originally cast rays may be reduced. The depth of recursion may similarly be decreased, as may soft shadow quality. The priority assigned to rays may be decreased along with the number of multisampling anti-aliasing samples.

Where so configured, the processing resources used to render the image may be reduced according to a processing requirement of another application, and/or a need for a motion blur. Saved processing resources may be allocated to another application.

In one embodiment, the difference between frames may be determined according to a positional change relative to a reference. Exemplary references may include a pixel or an object. The difference may include a vector directional change.

The difference between frames may be determined by detecting a rate of change associated with the respective ray origins. In one embodiment, the determined rate of change may be compared to a threshold rate of change. The rate of change may be based upon a rate of change associated with preceding frames of the plurality of frames. Alternatively or additionally, the rate of change may be based upon a future programmatic event likely to initiate an increase in the rate of change between the ray origins of the frames.

Aspects of the invention may include a memory configured to store frame information comprising image data, an acceleration data structure including a plurality of nodes that each correspond to a portion of the image data, and program code configured to conduct ray tracing and to determine a difference between respective ray origins of a plurality of frames. The program code may reduce an amount of processing resources used to render an image according to the determined difference. A processor in communication with the memory and configured to execute the program code may reduce the amount of processing resources used to render the image according to the determined difference.

Embodiments may include a memory configured to store a frame comprising image data logically divided into bounding volumes and an acceleration data structure including nodes that correspond to the bounding volumes. A processor in communication with the memory may be configured to receive a plurality of frames including the three-dimensional image data and to generate a ray that travels from a ray origin. The processor may further be configured to modify the acceleration data structure in response to a change in a relative position of the ray origin in between frames.

Aspects of the invention may include a program product comprising program code configured to conduct ray tracing and to determine a difference between respective ray origins of a plurality of frames, and to reduce an amount of processing resources used to render an image according to the determined difference. The program product may include a computer readable medium bearing the program code.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments of the invention.

DETAILED DESCRIPTION

Embodiments consistent with the principles of the present invention may provide image rendering in a manner that reduces computational requirements based on the change in perspective between frames. The computational requirement of a ray tracing operation may be reduced in response to a rapid change in the vantage point. Aspects may capitalize on a recognition of a relatively fast rate of change by exchanging visual acuity for saved processing power and other resources.

Embodiments may include a ray tracing operation where an ADS is updated in between frames in response to a changing vantage point. Aspects of the invention may adjust the quality level of tree building in response to rapid changes in the "look at" of the user. Embodiments may have particular application where graphics-only scene data trees are employed. Alternatively or additionally, ADS building cycles may be skipped. All or some of the ADS may be built in intervals, e.g., after a preset number of frames.

Aspects of the invention may determine the rate of change in a camera view angle between frames. This determined rate of change may include any equivalent change to the model view matrix. The model view matrix may account for global scaling, translation and rotation operations.

More geometric image data may be added per leaf node in the tree in response to a sufficient, detected increase in the rate of change. The quality of the rendering algorithm may additionally be reduced. A ray tracing algorithm may decrease the depth of recursion, and may generate fewer reflected and spawned rays. The ray tracer may reduce the quality of soft shadows and global illumination samples, among other quality parameters. In another or the same embodiment, the resolution may be decreased, as may the number of multisample anti-aliasing (MSAA) samples. This reduction in quality may capitalize on the additional image data per leaf.

Alternatively or additionally, aspects of the invention may skip rebuilding the tree entirely in response to a high camera rate of change. Associated processes may generate a desired motion blur between frames. Another embodiment may automatically skip tree rebalancing for one or more frames after a certain number of frames, but may still insert image data geometry into a node where appropriate.

Figure 1:
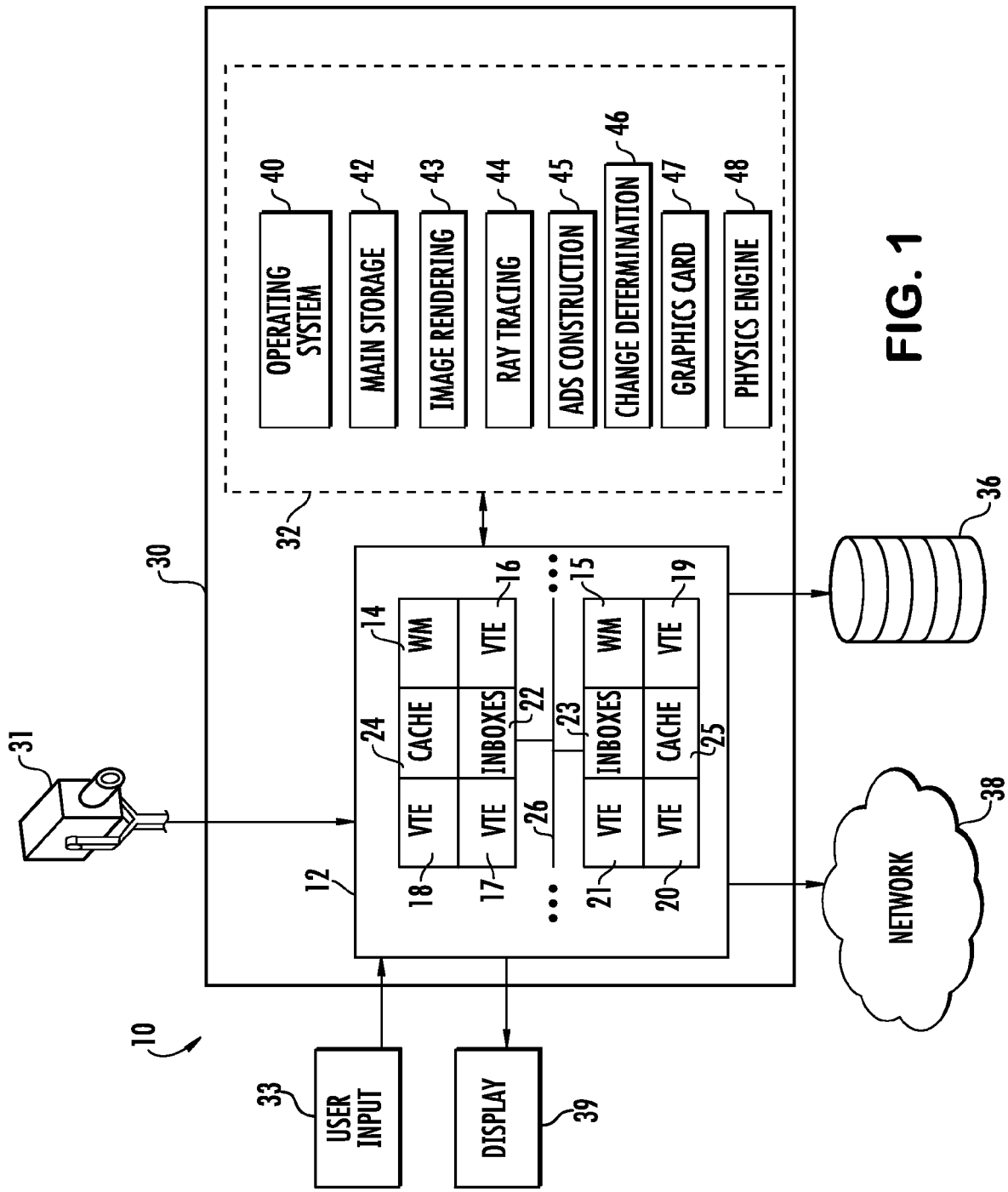
FIG. 1 shows a block diagram of a networked computer system configured to update an ADS in between image frames and in response to a changing vantage point and in accordance with the underlying principles of the present invention.

While the principles of this invention do not limit its forum or application, one image rending embodiment capitalizes on the structure available through the system 10 exemplified in FIG. 1. FIG. 1 generally shows a block diagram of a networked computer system 10 configured to update an ADS in between image frames and in response to a changing vantage point. The system 10 more particularly comprises one or more client computer(s) 30 coupled to a network 38. Network 38 represents a networked interconnection, including, but not limited to, local area, wide area, wireless, and public networks (e.g., the Internet). Moreover, any number of computers and other devices may be networked through network 38, e.g., multiple servers.

Computer system 10 will hereinafter also be referred to as an "apparatus," "computer," "tool," "device," or just "system," although it should be appreciated that the terms may respectively include many other controller configurations. Moreover, while only one network interface device is shown in FIG. 1, any number of computers and other devices may be networked through network 38. In still another embodiment, the system 10 may be implemented in a standalone configuration, i.e., disconnected from another computer or computer network.

Computer 30 typically includes at least one processor 12 coupled to a memory 32. Processor 12 may represent one or more processors (e.g., central processing units, microprocessors). More specifically, the processor 12 of FIG. 1 includes a multiple core processing element. Memory 32 may represent the SRAM devices comprising the main storage 42 of computer device 30, as well as any supplemental levels of memory, e.g., cache memories, non-volatile or backup memories (e.g., programmable or flash memories), read-only memories, etc. In addition, memory 32 may be considered to include memory storage physically located elsewhere in computer device 30, e.g., any cache memory present in processor 41, as well as any storage capacity used as a virtual memory, e.g., as stored within a database, or on another computer coupled to computer device 30 via network 38.

Computer device 30 also may receive a number of inputs and outputs for communicating information externally. For interface with a user, computer device 30 typically includes one or more input devices 33 (e.g., a keyboard, a mouse, a trackball, a joystick, a touch pad, iris/fingerprint scanner, and/or a microphone, among others). The computer device 30 additionally includes a display 39 (e.g., a CRT monitor, an LCD display panel, and/or a speaker, among others). It should be appreciated, however, that with some implementations of the computer device 30, direct user input and output may be unsupported by the computer, and interface with the server computer device 30 may be implemented through a computer or workstation networked with the computer device 30. As shown in FIG. 1, the system includes a camera 31 that may be used to capture images comprising the subject of a ray tracing operation.

For additional storage, the system 10 may also include one or more mass storage devices 36 configured to store, for instance, the film, animation or other image data. Exemplary devices 36 may include: a floppy or other removable disk drive, a flash drive, a hard disk drive, a direct access storage device (DASD), an optical drive (e.g., a CD drive, a DVD drive, etc.), and/or a tape drive, among others. Furthermore, computer device 30 may include an interface with one or more networks (e.g., a LAN, a WAN, a wireless network, and/or the Internet, among others) to permit the communication of information with other computers coupled to the network 38. It should be appreciated that computer device 30 typically includes suitable analog and/or digital interfaces between processor 12 and each of components 32, 33, 36, 38 and 39.

Computer device 30 may operate under the control of an operating system 40, and may execute various computer software and hardware applications, components, programs, or modules. For instance, the system 10 may include a main memory storage 42, an image rendering algorithm 43 and a ray tracing program 44. Other program code may include an ADS construction algorithm 45, a change determination program 46, a graphics card program code 47 and a physics engine 48. The image rendering program 43 may generally be used to create the image and may affect variables such as shadow quality, depth of recursion and sampling rates. The ray tracing program 44 may generally assist in image generation by tracing paths of light through pixels in an image plane. The graphics card program code 47 is typically executed by a video card, also known as a graphics accelerator card, display adapter, or graphics card, and functions to generate and output images to a display.

The ADS construction algorithm 45 may be used to generate a spatial index or other ADS used by the image rendering and/or ray tracing programs 43, 44. Spatial indexes are generally used by spatial databases to optimize spatial queries. Indexes used by non-spatial databases may be unable to effectively handle features such as how far two points differ and whether points fall within a spatial area of interest. Common spatial index methods include: grid, z-order, quadtree, Octree, UB-tree, R-tree, and kd-tree.

The change determination program 46 may determine the rate and/or perspective change of a camera viewpoint, i.e., the look at, between frames. As discussed herein, a frame includes a single, instantaneous image, i.e., a three-dimensional picture. As such, a frame may correspond to a grid of pixels. In the film and video game industry, a frame may be defined and/or is analogous to a single, uninterrupted roll of the camera. Multiple frames may be edited together to form a scene or sequence. A completed screenplay or film is made up of a series of scenes. As such, multiple frames are linked to form what appears to the human eye to be a continuously moving image.

The physics engine 48 may comprise an application that simulates real world physical phenomena as applied to objects within a three-dimensional scene. The physics engine 48 may be used to simulate and predict the effects of physical phenomena on a frame-to-frame basis. For example, the physics engine 48 may perform position updates for an object if the object is moving, and may perform collision detection tests to determine if an object collides with any other objects within the three-dimensional scene. According to one embodiment of the invention, the physics engine 48 may use multiple threads on a multiple core processing element to perform physics related calculations.

The processor 12, e.g., multiple core processing element, may include a plurality of basic throughput engines (BTEs). A BTE may comprise a plurality of processing threads and a core cache, such as a Level 1 (L1) cache. As shown in FIG. 1, the threads of the BTEs are assigned to or otherwise comprise workload managers 14, 15 and vector throughput engines 16, 17, 18, 19, 20, 21. A workload manager 14, 15 generally traverses an ADS with a ray issued by the system 10. As described herein, an ADS may be implemented as a tree type data structure used to divide a relatively large three-dimensional scene into smaller bounding volumes. The system 10 may use ray tracing and the ADS to quickly determine ray-bounding volume intersections. In one embodiment of the invention, the workload manager may perform ray-bounding volume intersection tests by using the ADS.

A vector throughput engine 16, 17, 18, 19, 20, 21 generally determines if a ray intersects a primitive contained within a bounding volume. Subsequent to the workload manager 14, 15 determining a ray-bounding volume intersection, the workload manager 14, may use inboxes 22, 23 to send the ray to a vector throughput engine 16, 17, 18, 19, 20, 21. The vector throughput engine 16, 17, 18, 19, 20, 21 may then determine if the ray intersects a primitive contained within the bounding volume. The vector throughput engines 16, 17, 18, 19, 20, 21 may also perform operations relating to determining the color of the pixel through which the ray passed. The processing threads assigned to the workload managers 14, 15 and vector throughput engines 16, 17, 18, 19, 20, 21 may access a shared multiple core processing element memory cache 24, 25. The memory caches 24, 25 may comprise a Level 2 (L2) cache.

As discussed herein, the workload managers 14, 15 and vector throughput engines 16, 17, 18, 19, 20, 21 may also access inboxes 22, 23. The inboxes 22, 23 may comprise memory mapped address space. As such, the inboxes 22, 23 may be mapped to the processing threads located within each one of the BTEs. Each thread of the workload managers 14, 15 and vector throughput engines 16, 17, 18, 19, 20, 21 may include a memory mapped inbox and access to all of the other memory mapped inboxes 22, 23. The inboxes 22, 23 may comprise a low latency and a high bandwidth communications network used by the workload managers 14, 15 and vector throughput engines 16, 17, 18, 19, 20, 21.

The workload managers 14, 15 and vector throughput engines 16, 17, 18, 19, 20, 21 may use the inboxes 22, 23 as a network to communicate with and to redistribute data processing work amongst each other. In another embodiment, separate outboxes may be used in the communications network. For example, processing results may be received by separate outboxes. Where so configured, inboxes 22, 23 may also serve as outboxes. For example, workload managers 14, 15 may write the results of a processing function directly to the inbox 22, 23 of a vector throughput engine 16, 17, 18, 19, 20, 21 that will use the results.

The workload managers 14, 15 and vector throughput engines 16, 17, 18, 19, 20, 21 may partition and redistribute work to enhance overall system performance. Although only two units are shown in the processor 12, a system 10 that renders millions of primitives, per frame may include many such units.

FIG. 1 also shows a high speed bus 26 that enables workload managers 14, 15 to collect and distribute image processing related tasks to other workload managers 14, 15 and/or vector throughput engines 16, 17, 18, 19, 20, 21 of other units. Similarly, the bus 26 may enable each of the vector throughput engines 16, 17, 18, 19, 20, 21 to communicate with other vector throughput engines 16, 17, 18, 19, 20, 21 or the workload managers 14, 15.

The communication using the bus 26 may be accomplished without burdening the caches 24, 25 with data packets. Memory space from the caches 24, 25 may be allocated to the inboxes 22, 23. An inbox 22, 23 may be assigned to a thread. Where desired, inbox memory may be exclusively assigned to the thread. The inbox 22, 23 may maintain the threads data and instructions in the assigned inbox portion of the cache 24, 25. Threads may use the inboxes 22, 23 to communicate with each other. Where one thread has data and/or instructions that are to be provided to another thread for an inbox 22, 23, the other thread may send the data and/or instructions to the inbox 22, 23. In one embodiment of the invention, memory space within an inbox 22, 23 may be mapped to a global memory address.

Embodiments may assign portions of the cache 24, 25 to the inboxes 22, 23 in order to create a low latency and high bandwidth communications network. The remaining portion of the cache 24, 25 may be unassigned and available to store information. Such information may comprise geometry and data structures used in ray tracing that may otherwise be unrelated to communications between processing threads. By using the inboxes 22, 23 for communications between processing threads and using the remaining portion of the cache 24, 25 to store geometry and data structures, data that is likely to be reused when tracing subsequent rays or rendering subsequent frames may remain in the cache 24, 25. Data that is unlikely to be reused when tracing subsequent rays or rendering subsequent frames, such data processing work, may not remain in the cache 24, 25.

As discussed herein, certain embodiments consistent with the invention include microprocessors to execute multiple threads in parallel, effectively providing many of the same performance gains attainable through the use of multiple microprocessors. Embodiments may further include a number of computer software and hardware technologies to facilitate additional parallel processing. From a software standpoint, multithreaded operating systems and kernels have been developed that permit computer programs to concurrently execute in multiple threads to concurrently perform multiple tasks. Threads generally represent independent paths of execution for a program.

In general, the routines executed to implement the embodiments of the invention, whether implemented in hardware, as part of an operating system, or as a specific application, component, program, engine, process, programmatic tool, object, module, or sequence of instructions, or even a subset thereof, may be referred to herein as an "algorithm," "function," "program code," or simply "program." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. One of skill in the art should appreciate that embodiments consistent with the principles of the present invention may nonetheless use program code resident at only one or at any number of locations.

Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of computer readable, signal bearing media used to actually carry out the distribution. Examples of signal bearing, computer readable media include, but are not limited to tangible, recordable type media such as volatile and non-volatile memory devices, floppy and other removable disks, hard disk drives, magnetic tape, optical disks (e.g., CD ROMs, DVDs, etc.), among others, and transmission type media such as digital and analog communication links.

In addition, various program code described hereinafter may be identified based upon the application or engine within which it is implemented in a specific embodiment of the invention. However, it should be appreciated that any particular program nomenclature that follows is used merely for convenience, and thus the invention should not be limited to use solely in any specific application or engine identified and/or implied by such nomenclature.

Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

The various software components and resources illustrated in FIG. 1 may be implemented in a number of manners, including using various computer software applications, routines, components, programs, objects, modules, data structures and programs. Those skilled in the art will further recognize that the exemplary environments illustrated in FIG. 1 are not intended to limit the present invention. Indeed, those skilled in the art will recognize that other alternative hardware and/or software environments may be used without departing from the scope of the invention.

Figure 2:
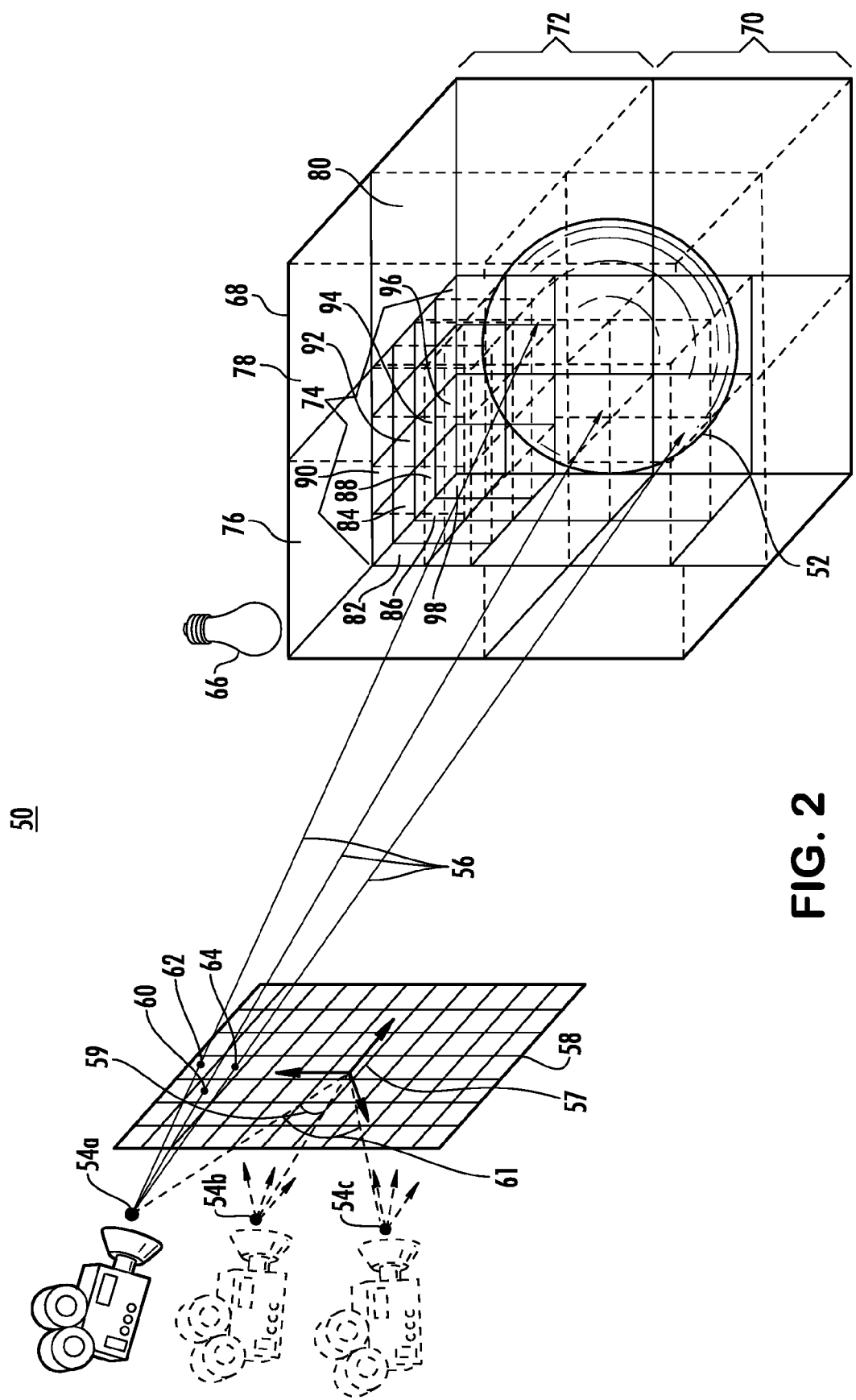
FIG. 2 shows a logical representation of a ray casting operation and virtual environment over a series of frames and in accordance with the underlying principles of the present invention.

FIG. 2 shows a logical representation of a ray casting operation and virtual environment 50 in accordance with the underlying principles of the present invention. The environment 50 more particularly shows a viewpoint (e.g., perspective, look at, camera view angle) changing over a series of frames. The environment 50 includes an object 52 viewed by the eye of an observer as represented by ray origin 54a. As such, the origin 54a may be associated with a camera viewpoint for a given frame. Dashed viewpoints 54b and 54c may represent the progression of the viewpoint over two subsequent frames.

Rays 56 extending from ray origin 54a may represent a perspective view of the object 52. The rays 56 may have properties and behavioral qualities analogous to light rays. The rays 56 may intersect a pixel plane 58 comprising multiple pixels. A pixel, or picture element, generally comprises the smallest piece of information in an image. Pixels are normally arranged in a two-dimensional grid. Each pixel is a sample of an original image and may include color components. The three-dimensional virtual environment 50 may be rendered into a two-dimensional picture by the image processing system 10. The resultant two-dimensional picture may be projected onto a monitor display 39. The display 39 may use many pixels of different colors to render the final two-dimensional picture.

As shown in FIG. 2, a ray 56 may traverse the virtual environment 50 and pixel plane 58, where the final two-dimensional picture will be rendered by the image processing system 10. As shown in FIG. 2, pixels 60, 62, 64 represent intersections of rays 56 from the ray origin 54a of the first frame.

Angle 59 may correspond to a change in the relative perspective between ray origins 54a and 54b. While other measurement processes may be used, one measurement technique consistent with an embodiment of the invention may include a measurement from the origin 54a relative to a reference point 57 in the environment 50. An exemplary reference point 57 is included in the pixel plane 58 of FIG. 2. In the embodiment of FIG. 2, the reference point 57 is near the center of the pixel plane 58. The measured change may comprise vector components, e.g., magnitude and direction components. This degree of change may be used by an embodiment of the present invention to adjust the ray processing operation.

Angle 61 shows a perspective change as between origin points 54a and 54c. In one embodiment, the vector change is measured using the vector change of a viewer over multiple frames. For instance, the change may account for changes in the direction a viewer is looking, as well as their distance from a reference during a video game or movie sequence. A suitable reference may include the reference point 57, but may alternatively be an object or other programmatic function in an environment 50. As shown in FIG. 2, the change in the origin points 54a, 54c of different frames may be measured relative to the reference point 57 of the operation 50. One skilled in the art will recognize that any angle measurements may be alternatively shown proximate the ray origins 54a, 54b, 54c. The frames and relative movement of the positions of the origin points 54b and 54c may occur over separate frames and according to the passage of a known interval of time. The origin points 54a, 54b, 54c used for the measurements may be taken from subsequent frames, but may skip frames in other embodiments.

The object 52 comprises part of an exemplary three-dimensional scene to be rendered by an image processing system 10. While only a sphere is shown in FIG. 2 for instructional purposes, objects typically are numerous and include different geometric shapes. Objects are often broken up into smaller geometric shapes (e.g., squares, circles, triangles, etc.). The larger objects are then represented by a number of the smaller simple geometric shapes. These smaller geometric shapes are often referred to as primitives.

As shown in FIG. 2, the object 52 and the surrounding space may be divided into one or more bounding volumes. As discussed herein, a large bounding volume 68 may correspond to a first node of an ADS. As discussed herein, the space may be divided into smaller portions. For instance, bounding volumes 70 and 72 may subdivide the bounding volume 68. Subdivided volumes 70 and 72 may further be divided into other bounding volumes 74, 76, 78, 80 roughly corresponding to a quarter of the original cube. As shown in FIG. 2, one of those bounding volumes 74 may be further logically subdivided into smaller sections 82, 84, 86, 88, 90, 92, 94, 96, 98.

One of skill in the art will recognize that the virtual space may be divided in any ratio according to any known scheme or ADS algorithm.

FIG. 2 also shows a light source 66. The light source 66 may illuminate the object 52. Depending on the location of the light sources 66 and the object 52, the light source 66 may cause shadows to be cast onto other objects (not shown) within the scene.

The pixel plane 58 may include millions of pixels. Each individual pixel may display a different color to render the final composite two-dimensional picture on the display 39. The ray tracing algorithm 44 may calculate the colors that the issued rays 56 encounter in the environment 50. The image processing system 10 may assign the colors encountered by the ray to the pixel 60, 62, 64 through which the ray 56 passed on its way from the origin 54a to the object 52 or other portion of the three-dimensional scene. Where a number of rays intersect a pixel, the color of the pixel may be determined by each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system. For example, if a ray does not intersect an object within the scene it may be assigned a default background color, e.g., approximating the color of the sky.

Many factors may contribute to the color of the object struck by the ray 56. For example, light sources within the three-dimensional scene may illuminate the object. Furthermore, physical properties of the object may contribute to the color of the object. For example, if the object is reflective or transparent, other non-light source objects may then contribute to the color of the object.

In order to determine the effects from other objects within a three-dimensional environment, secondary rays may be issued from the point where the original ray 56 intersected the object 52. For example, one type of secondary ray may be a shadow ray. A shadow ray may be used to determine the contribution of light to the point where the original ray 56 intersects the object.

Another type of secondary ray may be a transmitted ray. A transmitted ray may be used to determine what color or light may be transmitted through the body of the object 52. A transmitted ray may be issued by the image system 10 if the object with which the original ray intersected has transparent or translucent properties. For instance, the obstructing object may comprise glass. A transmitted ray traverses through the object at an angle relative to the angle at which the original ray struck the object.

Furthermore, a third type of secondary ray may be a reflected ray. A reflected ray may be used to determine what color or light is reflected onto the object. If the object with which the original ray intersected has reflective properties, like metal, then a reflected ray may be issued to determine what color or light may be reflected by the object. Reflected rays traverse away from the object at an angle relative to the angle at which the original ray intersected the object.

A shadow ray may be traced from the point of intersection of the original ray 56 and the object 52 to the light source 66. Should the ray reach the light source without encountering another object before the ray reaches the light source, the light source 66 may illuminate the object 52 struck by the original ray 56 at the point where the original ray struck the object 52. Other shadow rays may have their path between the point where the original ray struck the object and the light source is blocked by another object (not shown). If the obstructing object is opaque, then the light source will not illuminate the object at the point where the original ray struck the object. Thus, the light source may not contribute to the color of the original ray. However, if the object is translucent or transparent, the light source may illuminate the object at the point where the original ray struck the object.

The total contribution of color and light of all secondary rays (e.g., shadow rays, transmitted rays, reflected rays, etc.) may contribute to the final color of the pixel through which the original ray passed.

Figure 3:
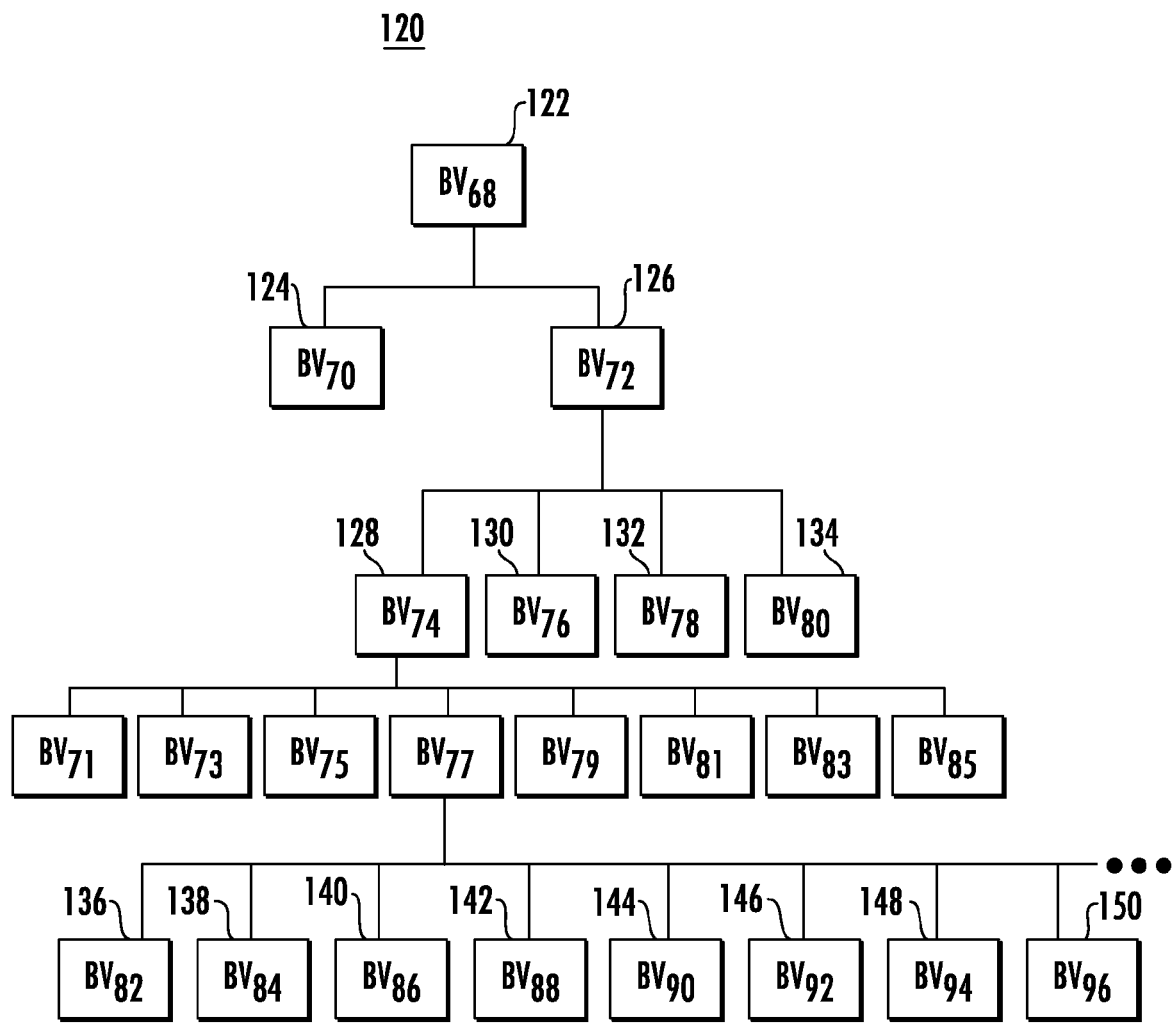
FIG. 3 shows an ADS that may be generated using the ray casting operation structure of FIG. 3 and that corresponds to the environment of FIG. 2.

FIG. 3 shows an ADS 120 that roughly corresponds to one that may be generated using the ray casting operation structure of FIG. 3. More particularly, node 122 of the ADS 120 generally corresponds to bounding volume 68 of FIG. 2. Bounding volumes 70, 72 of FIG. 2 may be represented generally by nodes 124, 136 of FIG. 3. Accordingly, nodes 128, 130, 132, 134 of FIG. 3 respectively correspond to bounding volumes 74, 76, 78, 80 of FIG. 2. As shown in FIG. 3, leaf nodes 136, 138, 140, 142, 144, 146, 148, 150 roughly correspond to the smallest bounding volumes 82, 84, 86, 88, 90, 92, 94, 96 of FIG. 2.

An ADS 120 may be useful in quickly and efficiently determining if an issued ray 56 intersects any objects 52 within the scene to be rendered. The ADS 120 may divide a three-dimensional scene or world into relatively smaller volumes that may or may not include primitives. An image processing system 10 may then use the known boundaries of these smaller volumes to determine if a ray may intersect primitives contained within the smaller volumes. If a ray 56 does intersect a volume containing primitives, then a ray intersection test may be run using the trajectory of the ray 56 against the known location and dimensions of the primitives contained within that volume.

If a ray 56 alternatively does not intersect a particular volume, then there may be no need to run ray-primitive intersection tests against the primitives contained within that volume. Furthermore, if a ray intersects a bounding volume that does not contain primitives, then there may not be a need to run ray-primitive intersections tests against that bounding volume. Thus, by reducing the number of ray-primitive intersection tests that may be necessary, the use of a spatial index greatly increases the performance of a ray tracing image processing system 10. Some examples of different spatial index ADS' include octrees, kd-trees, and binary space partitioning trees (BSP trees). While several different ADS' exist, for ease of describing embodiments of the present invention, a kd-tree will be used in the examples to follow. However, those skilled in the art should recognize that embodiments of the invention may be applied to any of the different types of other ADS'.

Some cost function in a kd-tree may be used to recursively split the scene by axis-aligned planes. Initially, the scene may be split in two by a plane. Each half may then be split again along some other plane, and the process may repeat. This technique may result in a hierarchical organization of the structure. Each level of the kd-tree may be recursively traversed to determine where the next level of the structure may be found. Cost functions may be carefully selected in the construction phase of these structures to achieve optimum performance while traversing these trees.

Described another way, a kd-tree uses axis aligned bounding volumes to partition the entire space into smaller volumes. That is, the kd-tree may use splitting planes to divide a three-dimensional space into smaller bounding volumes. Together the smaller bounding volumes make up the entire space in the scene. The determination to partition, or divide, a larger bounding volume into two smaller bounding volumes may be made by the image processing system 10 using the ADS construction algorithm 45.

Embodiments of the present invention may determine when to partition using change determination information relating to a change in viewpoint over multiple frames. One criterion for determining when to partition a bounding volume into smaller volumes may be the number of primitives contained within the bounding volume. That is, as long as a bounding volume contains more primitives than a predetermined leaf node threshold, the ADS construction algorithm 45 may continue to divide volumes by drawing more splitting planes. Another criterion for determining when to partition a bounding volume into smaller volumes may be the amount of space contained within the bounding volume. Furthermore, a decision to continue partitioning the bounding volume may also be based on how many primitives may be intersected by the plane that creates the bounding volume.

Turning more particularly to FIG. 3, the ADS 120 may comprise a binary structure representing the partitioning of the scene/environment 50. The binary tree structure of the ADS 120 comprises nodes, branches and leaves. For instance, internal node 126 within the ADS 120 may represent a relatively large bounding volume 72. Node 126 may contain branches to sub-nodes 128, 130, 132, 134 that may respectively represent four relatively smaller partitioned volumes 74, 76, 78, 80. These bounding volumes 74, 76, 78, 80 result after a partitioning of the relatively large bounding volume 72 by a splitting plane.

In an axis-aligned kd-tree, each internal node may include branches to other nodes. An internal node may store information such as pointers to leaf nodes, as well as where along which axis the splitting plane was drawn. In one arrangement, the internal node may include branches (i.e., pointers) to leaf nodes. A leaf node 136 is a node that is not further sub-divided into smaller volumes and contains pointers to primitives. An internal node may also contain branches to other internal nodes that are further sub-divided. An internal node may also include the information needed to determine along what axis the splitting plane was drawn and where along the axis that the splitting plane was drawn.

The ADS construction algorithm 45 may continue to partition a bounding volume 77 so long as it contains more than a predetermined leaf node threshold of primitives. For example, one embodiment may use a threshold of two primitives. Accordingly, the ADS construction algorithm 45 may stop partitioning a bounding volume 90 that contains less than or equal to the number of primitives associated with the threshold. Such a node 144 comprises a leaf node because it is not further sub-divided.

The resulting kd-tree or other spatial index structure may be stored in the shared memory cache 24. The kd-tree and the size of corresponding data that comprises the kd-tree may be optimized for storage in the shared memory cache 24. Although FIG. 3 shows an ADS 120 corresponding to a three-dimensional environment 50, another kd-tree embodiment consistent with the invention may correspond to a two dimensional scene to be rendered by the image processing system.

With collective reference to FIGS. 1-3, the system 10 of one embodiment may follow a pattern of issuing rays starting from the top of the pixel plane 58 and continue issuing rays, one ray per pixel, moving down the grid of pixels until a ray has been issued for each pixel in the plane 58. Multiple rays may ultimately issue through select pixels.

The workload manager 14 may perform operations related to the traversal of the rays 56 through the ADS 120. For instance, the workload manager 14 may traverse the ray through the ADS 120 by taking branches to nodes 122, 126, 128 defining bounding volumes 68, 72, 74 intersected by the ray 56 until a leaf node 150 is reached. Put another way, the workload manager 14 may use the coordinates and trajectory of an issued ray 56 to determine if it intersects bounding volumes 68, 72, 74 defined by the nodes 122, 126, 128 in the ADS 120. The workload manager 14 may continue traversing the ADS 120 until the ray 56 intersects a bounding volume 96 that contains only primitives (i.e., a leaf node). After traversing the ray 56 to a leaf node 150, the workload manager 14 may send information defining the ray 56 and an intersected pixel 64, as well as information defining an intersected node 124 to a vector throughput engine 18.

After the workload manager 14 sends the ray information to a vector throughput engine 18, it may begin traversing another ray 56 through the ADS 120. Thus, the workload manager 14 may continuously traverse rays 56 through the ADS 120 while the vector throughput engines 16, 17, 18, 19, 20, 21 are determining if rays 56 intersect an object 52 within the environment 50. That is, the vector throughput engines 16, 17, 18, 19, 20, 21 may perform ray-primitive intersection tests after they have received the information defining the ray 56 and the bounding volume. The vector throughput engines 16, 17, 18, 19, 20, 21 may determine the color of the object 52 at the point where it is intersected by the ray 56. After determining the color of the object at the intersection point, the vector throughput engine 16 may update the color of the pixel 60 through which the ray 56 passed. For example, the vector throughput engine 16 may write to a frame buffer memory location that corresponds to the pixel 60.

The vector throughput engines 16, 17, 18, 19, 20, 21 may generate secondary rays. For example, a vector throughput engine 16 may generate a reflected ray and a transmitted/refracted ray. Both secondary rays may originate from a point where an original ray 56 intersected the object 52. As described herein, the secondary rays may be used to determine additional color contribution to the object 52 at the point where the ray 56 intersected the object 52. The generation of such secondary rays may include determining a trajectory for each and tagging them such that the additional color contribution from the secondary ray may be used to update the color of the pixel 60 through which the original ray 60 passed. The vector throughput engine 16 may use an inbox 22 to send information defining a secondary ray to a workload manager 14. The workload manager 14 that receives the secondary ray information may use trajectory and other information to traverse the ADS 120.

Figure 4:
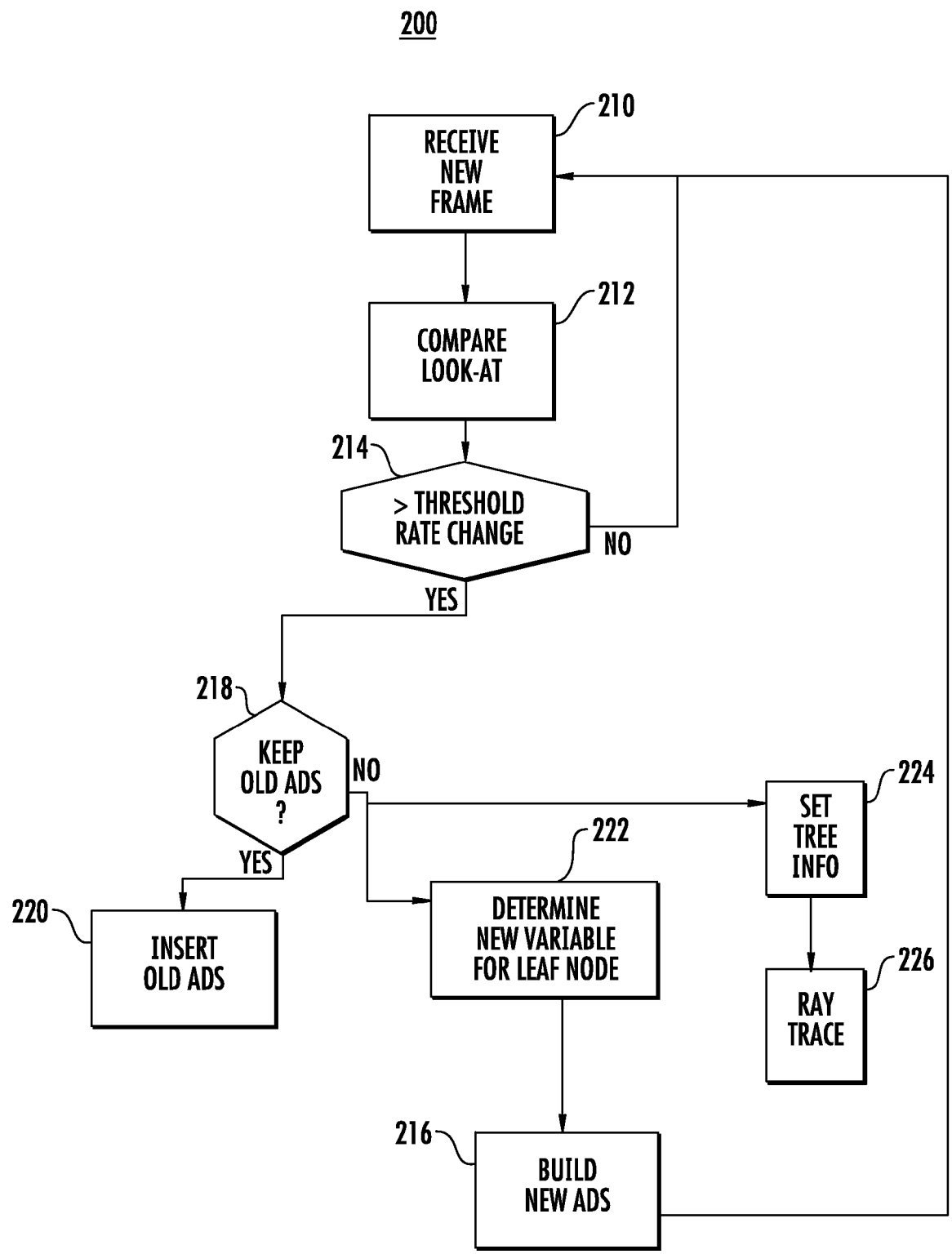
FIG. 4 is a flowchart having steps executable by processes of the system of FIG. 1 for rendering image data according to a rate of change in the perspective of a viewer in between frames.

FIG. 4 is a flowchart 200 having steps executable by processes of the system 10 of FIG. 1 for rendering image data according to a rate of change in the perspective of a viewer in between frames. More specifically, processes of FIG. 4 may affect the rendering computational requirement based on the rate of change of a camera perspective in between frames and in accordance with the underlying principals of the present invention. In one embodiment, the computational requirement may be reduced in response to a rapid change in the perspective. Aspects of the invention may include a ray tracing operation where an ADS 120 is updated in between frames in response to a changing vantage point. Aspects of the invention may adjust the quality level of tree building in response to rapid changes in the look at of the user. In one respect, the flowchart 200 shows steps for selectively constructing or reusing an ADS 120 based upon a number of processing criteria.

Turning more particularly to the steps of FIG. 4, the system 10 may receive at block 210 a new frame. As discussed herein, a frame may include a single, instantaneous image, i.e., a three-dimensional scene 50 corresponding to a pixel plane 58. At block 212, the system 10 may compare the ray origin points 54a, 54b between an old and the new frame. In one embodiment, the ray origin points 54a, 54b and associated vector measurements may be compared to a reference point 57 at the center or other location of the pixel plane 58.

The system 10 may determine at block 214 if the rate of change is greater than some predetermined threshold rate of change. This threshold rate of change may be set where desired to a relatively high rate of change. Such a high rate of change may correspond to instances where motion blur is naturally expected, such as where a viewer is quickly panning a scene. The predetermined threshold may also coincide with an instance where an inefficient or otherwise undesirable amount of processing would be required to timely and completely update the ADS.

If the predetermined threshold rate of change is not met or exceeded at block 214, the system 10 may build a new ADS at block 216. Construction of the new ADS may include the ray traversal and associated intersection determinations described herein.

Should the determined rate of change at block 214 alternatively be greater than the threshold, the system 10 may determine at block 218 whether it should keep and display data associated with the existing ADS 120. This determination at block 218 may involve many factors. For instance, the system 10 may recognize a current or future need for processing/computational resources elsewhere. This recognition may prompt or influence the system 10 to preserve processing by reusing the previous ADS 120 for the new frame.

In another example, the system 10 determine that the old ADS 120 should be used based on the proximity of the frame to another frame having an attention drawing event, e.g., an off-scene explosion or crash, is likely to quickly cause a change in the vantage point. The system 10 knows that the attention and focus of the viewer will be diverted, so it assumes that the geometry of the ADS for the new frame will likely be mostly the same. As such, constructing a new ADS may be inefficient.

As discussed herein, a change in the direction of the camera may cause the system 10 to reuse the old ADS 120. An old ADS 120 may also be used where objects are moving very quickly in the scene. A level of blur simulated by reusing the ADS 120 may be appropriate based on the natural inability of a viewer to quickly focus on fast moving objects.

The same ADS 120 may be reused where a certain level of blur is desired. Selectively reusing a pattern of old ADS' may simulate a naturally occurring blur. ADS construction for a new frame may be skipped (and the old ADS 120 used) based on a rate of change of the vantage point in relation to the previous frame(s). The system 10 may automatically surmise from the previous rate that the perspective is quickly panning. When the perspective is changing at a high rate of speed, it is unlikely to stop suddenly. The perspective may take several frames to slow down to a stop. This scenario may be an appropriate time to reuse the old ADS 120 at block 220, instead of building a new one. To this end, the system 10 may look at a history of data to determine for how many frames the perspective has been changing at a relatively high rate, among other data.

Where the old ADS 120 is to be kept at block 218, the system 10 may essentially skip construction of a new ADS for the new frame(s). While this may be accomplished on a frame-by-frame basis, the system 10 may alternatively skip a preset number of frames, e.g., every nth frame.

Where the system 10 alternatively determines at block 218 that the old ADS 120 should not be kept, the system 10 may still take steps to optimize processing requirements. As with the decision as to whether to keep the old ADS 120 at block 218, the optimization at block 222 may be based on the rate of perspective change. More particularly, the system 10 at block 222 may determine a new variable for contribution into the leaf node threshold. As discussed herein, the new variable may increase the number of primitives allowed in each leaf node. This feature may reduce the number of generated leaf nodes, branches, pointers and associated computational requirements when the new ADS is built at block 216.

An embodiment may concurrently set tree construction information at block 224. The new setting at block 224 may take advantage of a larger number of primitives per node set at block 222. This information may indicate a desired level of image rendering quality and may according affect at block 226 the operation of the ray tracing algorithm 44. As above, such information may be based upon the rate of change determined at block 212. Where such information indicates that the rate of change is relatively high, then the overall quality of the new ADS may be compromised for efficiency considerations. That is, the tree construction information may indicate that only a suboptimal tree is required. For example, the depth of recursion may be reduced, as may the number of spawned and secondary rays. The quality of soft shadows and the number of global illumination samples may be reduced, along with the number of cast rays. MSAA samples and resolution may decrease, and the priority level of certain rays or types of rays may be reduced. These actions may be accomplished singularly or in combination to reduce the overall computing requirement associated with ray tracing and image rendering.

While the present invention has been illustrated by a description of various embodiments and while these embodiments have been described in considerable detail, it is not the intention of the Applicants to restrict, or, in any way limit the scope of the appended claims to such detail. For instance, rather than keeping the entire old ADS, one embodiment may just keep some of the data, and replace/update portions of the old ADS. The invention in its broader aspects is therefore not limited to the specific details, representative apparatus and method, and illustrative example shown and described. Accordingly, departures may be made from such details without departing from the spirit or scope of Applicants' general inventive concept.

What is claimed is:

1. A method of rendering an image using ray tracing, the method comprising:
   determining a rate of change between a first ray origin of a first ray cast in a first frame and a second ray origin of a second ray cast in a second frame, wherein the first frame is a new frame, wherein the second frame is an existing frame, wherein the first ray origin and the second ray origin correspond to a moving camera perspective;
   comparing the determined rate of change to a threshold rate of change to determine whether the determined rate of change is more than the threshold rate of change, wherein the threshold rate of change is a relatively high rate of change that corresponds to a motion blur that is naturally expected; and
   determining whether to build a new acceleration data structure based on the comparison of the determined rate of change and the threshold rate of change, including:
      in response to determining that the determined rate of change is not more than the threshold rate of change:
         building the new acceleration data structure in a manner that reduces an amount of processing resources; and
         using the new acceleration data structure to render the image of the first frame;
      in response to determining that the determined rate of change is more than the threshold rate of change:
         determine whether the second frame includes an off-scene attention drawing event:
            in response to determining that the second frame includes the off-scene attention drawing event:
               reusing an existing acceleration data structure to render the image of the first frame as the off-scene attention drawing event of the second frame will divert a viewer's focus temporarily and the viewer's focus will likely revert to a frame prior to the second frame; and
               rendering the image based on the existing acceleration data structure.

2. The method of claim 1, further comprising reducing the amount of processing resources used by reducing the visual acuity of the rendered image.

3. The method of claim 1, further comprising reducing the amount of processing resources used by reducing a number of generated secondary rays.

4. The method of claim 1, further comprising reducing the amount of processing resources used by reducing a number of rays cast.

5. The method of claim 1, further comprising reducing the amount of processing resources used by reducing a depth of recursion of cast rays.

6. The method of claim 1, further comprising reducing the amount of processing resources used by reducing soft shadow quality.

7. The method of claim 1, further comprising reducing the amount of processing resources used by reducing multisampling anti-aliasing samples, reducing resolution, or any combination thereof.

8. The method of claim 1, further comprising reducing the amount of processing resources used by reducing a priority designation associated with rays.

9. The method of claim 1, further comprising:
   in response to determining that the second frame does not include the off-scene attention drawing event:
      building the new acceleration data structure in a manner that reduces an amount of processing resources; and
      using the new acceleration data structure to render the image of the first frame.

10. The method of claim 1, wherein the off-scene attention drawing event is an off-scene explosion, an off-scene crash, or any combination thereof.

11. The method of claim 1, further comprising reducing the amount of processing resources used by reducing a number of global illumination samples.

12. The method of claim 1, further comprising reducing the amount of processing resources used by building a suboptimal tree for the new acceleration data structure.

13. The method of claim 1, further comprising reducing the amount of processing resources used by:
   determining a new variable that increases a number of primitives included per node of the new acceleration data structure; and
   using the new acceleration data structure and the new variable to render the image of the first frame.

14. An apparatus comprising:
   a memory configured to store program code configured to render an image using ray tracing, wherein the program code is configured to:
      determine a rate of change between a first ray origin of a first ray cast in a first frame and a second ray origin of a second ray cast in a second frame, wherein the first frame is a new frame, wherein the second frame is an existing frame, wherein the first ray origin and the second ray origin correspond to a moving camera perspective;

compare the determined rate of change to a threshold rate of change to determine whether the determined rate of change is more than the threshold rate of change, wherein the threshold rate of change is a relatively high rate of change that corresponds to a motion blur that is naturally expected; and determine whether to build a new acceleration data structure based on the comparison of the determined rate of change and the threshold rate of change, including:

in response to determining that the determined rate of change is not more than the threshold rate of change:
build the new acceleration data structure in a manner that reduces an amount of processing resources; and
use the new acceleration data structure to render the image of the first frame;

in response to determining that the determined rate of change is more than the threshold rate of change:
determine whether the second frame includes an off-scene attention drawing event:
in response to determining that the second frame includes the off-scene attention drawing event:
reuse an existing acceleration data structure to render the image of the first frame as the off-scene attention drawing event of the second frame will divert a viewer's focus temporarily and the viewer's focus will likely revert to a frame prior to the second frame; and
render the image based on the existing acceleration data structure; and a processor in communication with the memory and configured to execute the program code.

15. The apparatus of claim 14, wherein the off-scene attention drawing event is an off-scene explosion, an off-scene crash, or any combination thereof.

16. The apparatus of claim 14, wherein the program code is configured to:
in response to determining that the second frame does not include the off-scene attention drawing event:
build the new acceleration data structure in a manner that reduces an amount of processing resources; and
use the new acceleration data structure to render the image of the first frame.

17. The apparatus of claim 14, wherein the program code is configured to reduce the amount of processing resources used by building a suboptimal tree for the new acceleration data structure.

18. The apparatus of claim 14, wherein the program code is configured to reduce the amount of processing resources used by:
determining a new variable that increases a number of primitives included per node of the new acceleration data structure; and
use the new acceleration data structure and the new variable to render the image of the first frame.

19. An apparatus comprising:
a memory configured to store program code configured to render an image using ray tracing; and
a processor in communication with the memory and configured to execute the program code to:
determine a rate of change between a first ray origin of a first ray cast in a first frame and a second ray origin of a second ray cast in a second frame, wherein the first frame is a new frame, wherein the second frame is an existing frame, wherein the first ray origin and the second ray origin correspond to a moving camera perspective, compare the determined rate of change to a threshold rate of change to determine whether the determined rate of change is more than the threshold rate of change, wherein the threshold rate of change is a relatively high rate of change that corresponds to a motion blur that is naturally expected, and determine whether to build a new acceleration data structure based on the comparison of the determined rate of change and the threshold rate of change, including:

in response to determining that the determined rate of change is not more than the threshold rate of change:
build the new acceleration data structure, wherein building the new acceleration data structure includes determining a new variable that increases a number of primitives included per node of the new acceleration data structure, and
use the new acceleration data structure and the new variable to render the image of the first frame, and in response to determining that the determined rate of change is more than the threshold rate of change:
determine whether the second frame includes an off-scene attention drawing event:
in response to determining that the second frame includes the off-scene attention drawing event:
reuse an existing acceleration data structure to render the image of the first frame as the off-scene attention drawing event of the second frame will divert a viewer's focus temporarily and the viewer's focus will likely revert to a frame prior to the second frame, and
render the image based on the existing acceleration data structure.

20. The apparatus of claim 19, wherein the program code is configured to:
in response to determining that the second frame does not include the off-scene attention drawing event:
build the new acceleration data structure, wherein building the new acceleration data structure includes determining a new variable that increases a number of primitives included per node of the new acceleration data structure, and
use the new acceleration data structure and the new variable to render the image of the first frame.

21. The apparatus of claim 19, wherein the off-scene attention drawing event is an off-scene explosion, an off-scene crash, or any combination thereof.

22. A program product, comprising:
program code configured to render an image using ray tracing, wherein the program code is configured to:
determine a rate of change between a first ray origin of a first ray cast in a first frame and a second ray origin of a second ray cast in a second frame, wherein the first frame is a new frame, wherein the second frame is an existing frame, wherein the first ray origin and the second ray origin correspond to a moving camera perspective, compare the determined rate of change to a threshold rate of change to determine whether the determined rate of change is more than the threshold rate of change, wherein the threshold rate of change is a relatively high rate of change that corresponds to a motion blur that is naturally expected, and determine whether to build a new acceleration data structure based on the comparison of the determined rate of change and the threshold rate of change, including:

in response to determining that the determined rate of change is not more than the threshold rate of change:

build the new acceleration data structure in a manner that reduces an amount of processing resources, and use the new acceleration data structure to render the image of the first frame, in response to determining that the determined rate of change is more than the threshold rate of change:

determine whether the second frame includes an off-scene attention drawing event:

in response to determining that the second frame includes the off-scene attention drawing event:

reuse an existing acceleration data structure to render the image of the first frame as the off-scene attention drawing event of the second frame will divert a viewer's focus temporarily and the viewer's focus will likely revert to a frame prior to the second frame, and render the image based on the existing acceleration data structure; and a non-transitory computer readable storage device bearing the program code.

23. The program product of claim 22, wherein the program code is configured to:

in response to determining that the second frame does not include the off-scene attention drawing event:

build the new acceleration data structure in a manner that reduces an amount of processing resources, and use the new acceleration data structure to render the image of the first frame.

24. The program product of claim 22, wherein the off-scene attention drawing event is an off-scene explosion, an off-scene crash, or any combination thereof.

25. The program product of claim 22, wherein the program code is configured to reduce the amount of processing resources used by:

determining a new variable that increases a number of primitives included per node of the new acceleration data structure, and using the new acceleration data structure and the new variable to render the image of the first frame.

* * * * *